United States Patent [19]
Cirineo

[11] Patent Number: 5,699,068
[45] Date of Patent: Dec. 16, 1997

[54] DOPPLER VIDEO SIGNAL CONDITIONING CIRCUIT

[75] Inventor: Anthony Cirineo, Ventura, Calif.

[73] Assignee: The United States of America as represented by the Secretary of the Navy, Washington, D.C.

[21] Appl. No.: 668,455

[22] Filed: May 28, 1996

[51] Int. Cl.$^6$ ...................................................... G01S 13/94
[52] U.S. Cl. .......................................................... 342/197
[58] Field of Search ................................. 342/197, 195, 342/162, 62

[56] References Cited

U.S. PATENT DOCUMENTS

| | | | |
|---|---|---|---|
| 3,680,096 | 7/1972 | Bosc | 342/162 |
| 3,737,900 | 6/1973 | Vehrs | 342/162 |
| 3,898,658 | 8/1975 | Jensen et al. | 342/116 |
| 4,003,051 | 1/1977 | Fitzgerald et al. | 342/160 |
| 4,780,837 | 10/1988 | Namekawa | 364/565 |
| 5,150,126 | 9/1992 | Knepper et al. | 342/137 |

*Primary Examiner*—Daniel T. Pihulic
*Attorney, Agent, or Firm*—Melvin J. Sliwka; David S. Kalmbaugh

[57] ABSTRACT

A doppler video signal conditioning circuit comprising first, second and third buffers which respectively receive a voltage controlled oscillator signal, a second intermediate frequency signal and a second local oscillator signal from a missile' radar receiver. The buffered voltage controlled oscillator, second intermediate frequency and second local oscillator signals are then supplied to a doppler processing circuit. The doppler processing circuit processes these signals, providing at its output a reconstructed doppler video signal which includes a marker which is 20 kHz above the frequency the missile's radar is tracking. The doppler processing circuit provides the reconstructed doppler video signal to an analog-to-digital converter. The analog-to-digital converter digitizes the reconstructed doppler video signal before supplying the digitized signal to a frame controller. The frame controller assembles the digital data of the reconstructed doppler video signal into a plurality of telemetry frames with each frame having 1024 eight bit words. The eight bit words of each telemetry frame are then supplied to a parallel to serial shift register which converts each word from a parallel format to a serial format. The frame controller also generates timing signals and control signals for the analog-to-digital converter and the serial to parallel shift register.

20 Claims, 14 Drawing Sheets

DOPPLER VIDEO SIGNAL CONDITIONING CIRCUIT

BACKGROUND OF THE INVENTION

1. Field of the Invention

The present invention relates generally to processing doppler video signals. More specifically, the present invention relates to a signal conditioning and processing circuit for reconstructing a doppler video signal, digitizing the doppler video signal and then assembling the digitized signal into a telemetry frame.

2. Description of the Prior Art

A missile's receiver antenna receives radio frequency (RF) signals or RF energy from a target the missile is tracking. The receiver antenna is coupled to a radar receiver which provides a second intermediate frequency signal indicative of RF energy reflected from the target the missile is tracking. This second intermediate frequency signal also includes RF energy which is clutter (e.g. RF energy reflected from the surface of the earth), RF energy generated by electronic counter measures, RF energy which is noise and RF energy from jet engine modulation. The missile's receiver also provides an internally generated second local oscillator signal and an internally generated voltage controlled oscillator signal.

There is currently a need to process the second intermediate frequency signal, the second local oscillator signal and the voltage controlled oscillator signal from the missile's receiver to provide a reconstructed doppler video signal. The reconstructed doppler video signal, in turn, indicates the target's velocity and other information about the target which the missile is currently tracking.

There is also a need to digitize and then assemble the reconstructed doppler video signal in a telemetry frame format which may be, for example, a pulse code modulated (PCM) data format. The PCM telemetry frame allows the missile's telemetry unit to transmit the reconstructed doppler video signal to a receiving station for analysis.

It is therefore an object of the present invention to reconstruct a doppler video signal from a missile's radar receiver.

It is another object of the present invention to digitize the reconstructed doppler video signal and then assemble the digitized doppler video signal in a pulse code modulated frame format for transmission by the missile's telemetry receiver to a ground station.

These, other advantages and objectives of the present invention will become more apparent to those skilled in the art as a more detailed description of the present invention is set forth below.

SUMMARY OF THE INVENTION

The doppler video signal conditioning circuit of the present invention comprises first, second and third buffers which respectively receive a voltage controlled oscillator signal, a second intermediate frequency signal and a second local oscillator signal from a missile's radar receiver. The buffered voltage controlled oscillator, second intermediate frequency and second local oscillator signals are then supplied to a doppler processing circuit. The doppler processing circuit processes these signals, providing at its output a reconstructed doppler video signal which includes a marker which is 20 kHz above the frequency the missile's radar is tracking. The doppler processing circuit is coupled to an analog-to-digital converter to receive the reconstructed doppler video signal from the doppler processing circuit. The analog-to-digital converter digitizes the reconstructed doppler video signal before supplying the digitized signal to a frame controller. The frame controller assembles the digital data of the reconstructed doppler video signal into a plurality of telemetry frames with each frame having 1024 eight bit words. The 1024 eight bit words of each telemetry frame are supplied by the frame controller to a parallel to serial shift register which converts each word of the telemetry frame from a parallel format to a serial format. The frame controller also generates timing signals and control signals for the analog-to-digital converter and the serial to parallel shift register.

DETAILED DESCRIPTION OF THE PREFERRED EMBODIMENT

Figure 1:
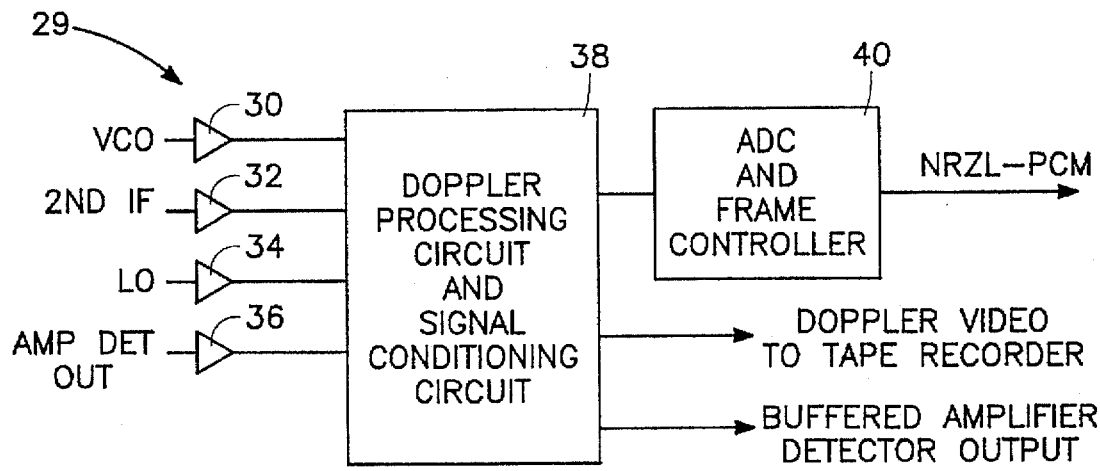
FIG. 1 is a block diagram of the doppler video signal conditioning circuit constituting the present invention.

Referring to FIG. 1, there is shown a doppler video signal conditioning circuit (designated generally by the reference numeral 29) for reconstructing a doppler video signal from the radar receiver of a missile. The missile's radar receiver provides three signals to the doppler video signal conditioning circuit 29, (1) a voltage controlled oscillator signal, (2) a second intermediate frequency signal and (3) a second local oscillator signal.

The second intermediate frequency, which is provided by the missile's radar receiver to circuit 29, represents the sum of the Radio Frequency (RF) energy received by the missile's radar receiver antenna from a target the missile is tracking, ground clutter and the like. The second intermediate frequency signal may be composed of varying amounts of target return, clutter, electronic counter measure RF energy, jet engine modulation lines, and system noise. Target return is RF energy that is reflected from the target the missile is tracking. The amplitude of the target return signal can vary from approximately −120 dBm to approximately −20 dBm. In addition, there may be multiple targets the missile is tracking with each target appearing within the doppler video spectrum and each target providing RF energy to the missile's radar receiver antenna.

Clutter is RF energy that is reflected from the surface of the earth or from waves on the water and appears within the doppler video spectrum of the missile's radar. The clutter signal may be the largest RF signal in the doppler video spectrum with high levels being from −30 dBm to −40 dBm.

Electronic counter measures place RF energy within the receiver bandwidth of the missile's radar attempting to confuse the tracking logic of the missile's radar. Amplitudes and position in the doppler video spectrum vary according to the electronic counter measures technique being utilized to confuse the tracking logic of the missile's radar. Typical high levels of electronic counter measures RF energy are from −30 dBm to −40 dBm.

Jet engine modulation lines appear in the doppler video spectrum of the missile's radar because the turbine blades of the target engine produce doppler returns centered about the target return. These components are generally lower in amplitude than the target return.

Other RF energy present in the sum video spectrum are generally grouped under the heading system noise. The source of these RF signals can be from a combination of one or more of the following RF energy sources: thermal noise (KTB noise), mixer spurs, noise generated from nearby digital circuits, harmonics of digital clocks, and noise from switching power supplies.

The second local oscillator signal is an internal signal generated by the missile's radar receiver. This signal is supplied from the receiver to circuit 29 to down convert the second intermediate frequency signal to a base band signal.

The voltage controlled oscillator signal is also an internal signal generated by the missile's radar receiver and is used to tune the receiver to a particular doppler frequency. The voltage controlled oscillator signal is supplied from the receiver to circuit 29 to generate a marker signal that may be inserted into the reconstructed doppler spectrum as a guide to locating the doppler frequency that the missile's radar is tracking. The marker signal is approximately 20 kHz above the frequency the missile's radar is tracking.

The doppler video signal conditioning circuit 29 includes buffers 30, 32 and 34 which are connected to the missile's radar receiver. Buffer 30 receives the voltage controlled oscillator signal from the radar receiver, buffer 32 receives the second intermediate frequency signal from the radar receiver and buffer 34 receives the local oscillator signal from the radar receiver. Buffers 30, 32 and 34 provide signal levels which allow processing of these signals by doppler processing circuit 38 without having an adverse effect on the operation of the missile's radar receiver.

Doppler processing circuit 38 receives the buffered voltage controlled oscillator signal from buffer 30, the second intermediate frequency signal from buffer 32 and the local oscillator signal from buffer 34. Doppler processing circuit 38 then processes and conditions these signals generating a reconstructed doppler video signal which is supplied to an analog-to-digital converter and frame controller 40. The reconstructed doppler video signal includes a marker generated by doppler processing circuit 38 which is 20 kHz above the frequency the missile's radar is tracking.

Analog-to-digital converter and frame controller 40 first digitize the doppler video signal which is in an analog format. Analog-to-digital converter and frame controller 40 next assemble the digitized signal into a Non-Return to Zero Level (NRZ-L) Pulse Code Modulated (PCM) data signal or data stream. The PCM data stream is supplied to an encryption unit (not illustrated) for encryption and the encrypted data stream is then transmitted from the missile's telemetry transmitter to a receiving station.

Figure 2:
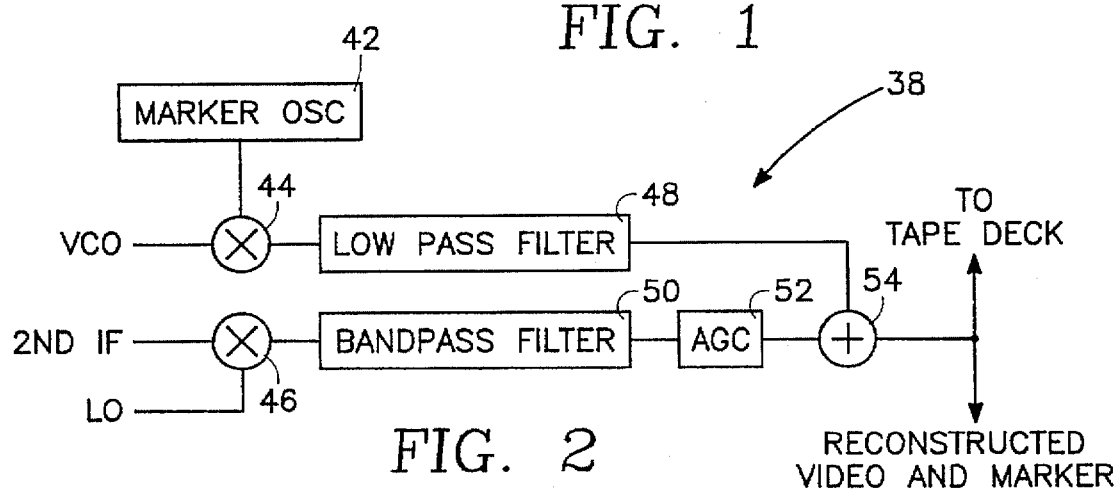
FIG. 2 is a block diagram of the doppler processing circuit of FIG. 1.

Referring now to FIGS. 1 and 2, the buffered second intermediate frequency signal and the buffered local oscillator signal are supplied to a mixer 46. Mixer 46 generates an output signal having output frequencies equal to the sum and difference frequencies of the second intermediate frequency and local oscillator signals.

The output signal from mixer 46 is supplied to a band pass filter 50 which passes therethrough only the difference frequency attenuating frequencies on either side of its band which is from about 3 kHz to about 250 kHz. The signal at the output of filter 50 is the difference frequency between the second intermediate frequency and local oscillator signals which comprises the reconstructed doppler video.

The reconstructed doppler video signal is next supplied to an automatic gain control circuit 52. The automatic gain control circuit 52 maintains the amplitude of the reconstructed doppler video signal within a predetermined window to prevent analog-to-digital converter 56 (FIG. 3) from being under or over driven.

Circuit 38 also includes a mixer 44 which receives the voltage controlled oscillator signal from buffer 30 and a marker oscillator signal generated by a marker oscillator 42. The 20 kHz marker signal is generated by the combination of mixer 44 and low pass filter 48 with the difference in frequency between the voltage controlled oscillator and the marker oscillator signals being the marker signal. Low pass filter 48 removes unwanted mixer products from the marker signal prior to the marker signal being supplied to a summer 54. Summer 54 also receives the reconstructed doppler video signal from automatic gain control circuit 52. Summer 54 then combines the marker signal and the reconstructed video signal to provide at its output the reconstructed doppler video signal with the 20 kHz marker.

At this time it should be noted that the exact frequencies of the voltage controlled oscillator, second intermediate frequency and local oscillator signals as well as the frequency of the signal generated by marker oscillator 42 are not being disclosed because these frequencies may be classified for certain missiles with which the present invention may be used. In addition, the cutoff frequency for low pass filter 48 is not disclosed since this frequency may be classified for certain missiles with which the present invention may be used. Generally, whenever a particular value or other information relating to a component of the present invention, a frequency of a signal or the like is omitted from the discussion of the present invention, the discussion may relate to classified information.

However, it should be understood by those skilled in the art that these details of the present invention are not particularly germane to an appreciation of the innovative concept of this invention except for the fact that these details might be classified as to particular missiles.

Figure 3:
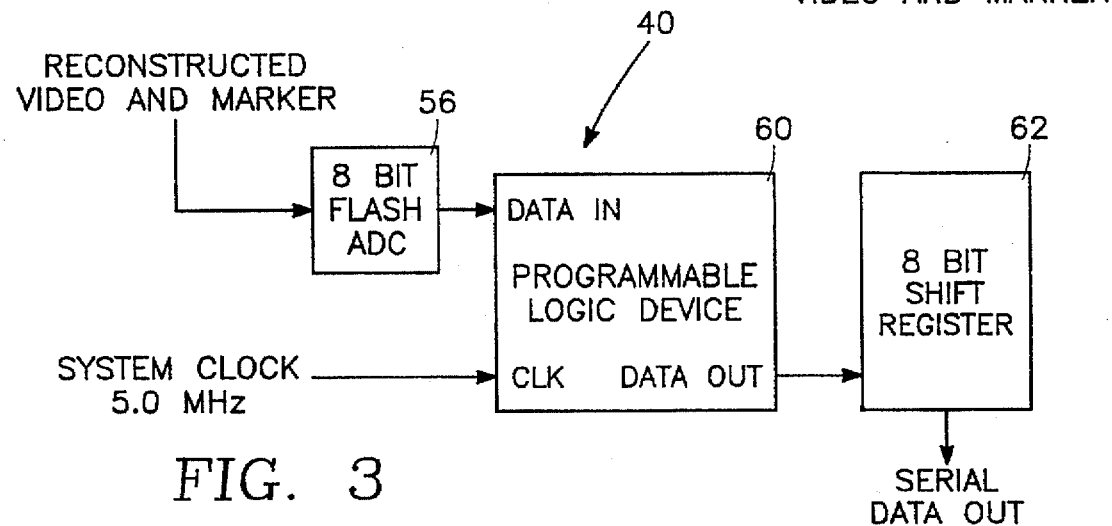
FIG. 3 is a block diagram of the frame controller circuit of FIG. 1.

Referring to FIGS. 1, 2 and 3, the reconstructed doppler video signal including the 20 kHz marker is supplied to eight bit analog-to-digital converter 56. The signal is also supplied to a video buffer 88 (illustrated in FIG. 13) which drives a wide band magnetic tape recorder (not illustrated). The sample rate for eight bit analog-to-digital converter 56 is 625 kilo-samples per second (ksps) which is based on a system clock signal of 5 MHz. With filter 50 having an upper band edge of 250 kHz, the sample rate for converter 56 is 2.5 times the highest frequency for filter 50. This allows sufficient over sampling to accurately reproduce the doppler spectrum in the passband range covered by filter 50.

Figures 4, 5:
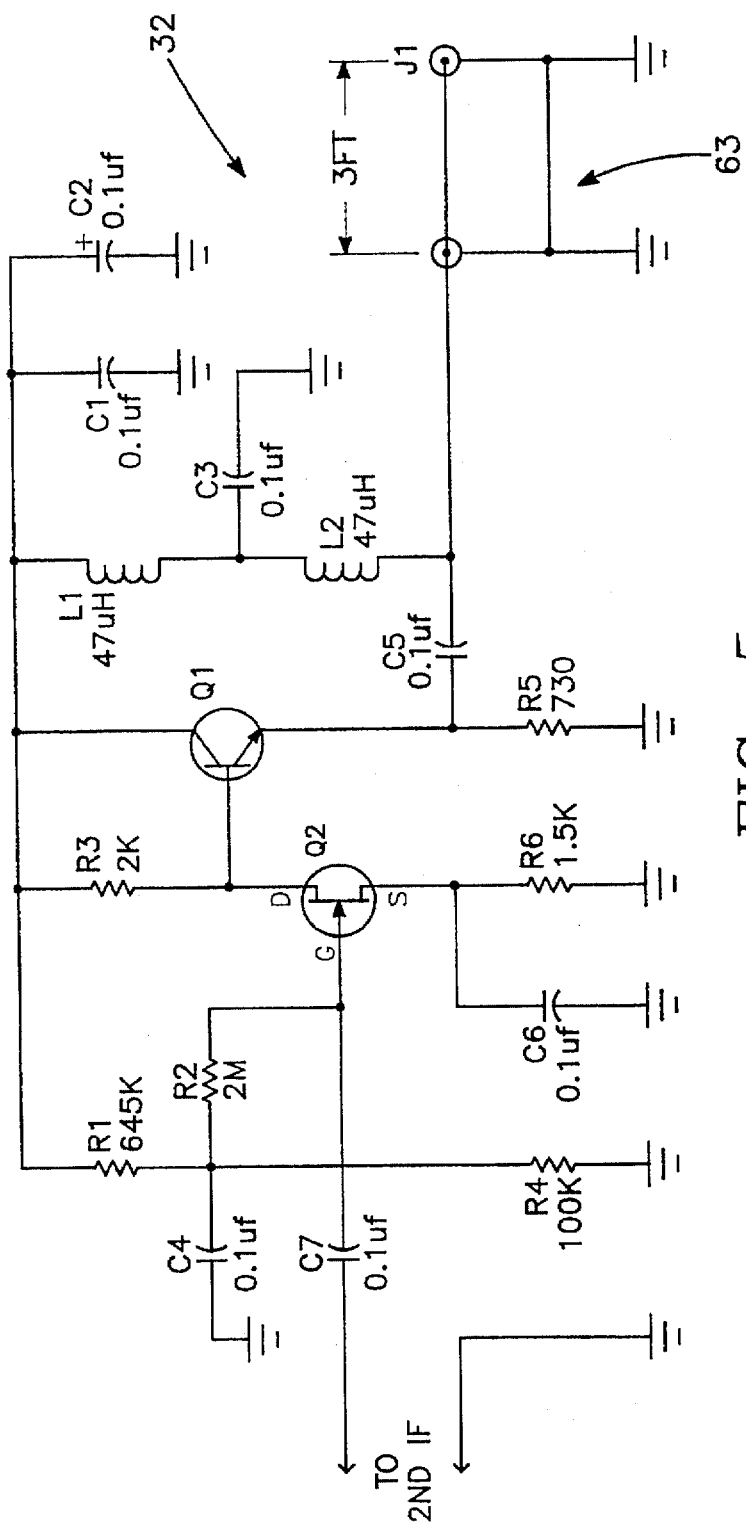
FIG. 4 is a schematic diagram illustrating a frame of pulse code modulated data assembled by the frame controller of FIG. 3.
FIG. 5 is a detailed electrical schematic diagram of the first stage of the second intermediate frequency buffer illustrated in FIG. 1.

Referring to FIGS. 3 and 4, the digitized doppler video signal is supplied to a programmable logic device 60 which assembles the signal into the telemetry frame illustrated in FIG. 4. The telemetry frame of FIG. 4 comprises 1024 eight bit words and a frame synchronization pattern which comprises the first two eight bit words of the frame synchronization pattern. The frame synchronization bit pattern for the two eight bit words is 1110 1011 and 1001 0000. Data in the telemetry frame is sent most significant bit first.

Programmable logic device 60 is connected to a parallel-load eight bit shift register 62 which converts the telemetry frame from a parallel format to a serial format.

At this time it should be noted that the programmable logic device 50 used in the preferred embodiment of the present invention is a Model EPM 5032 Erasable Programmable Logic Device commercially available from the Altera Corporation of San Jose, Calif. Analog-to-digital converter 56 is a Model CA3318C CMOS parallel (FLASH) analog-to-digital converter commercially available from Harris Semiconductor of Melbourne, Fla. Shift register 62 is a Model 74HC166 Parallel-Load 8-Bit Shift Register commercially available from Texas Instruments of Dallas, Tex.

Figure 6:
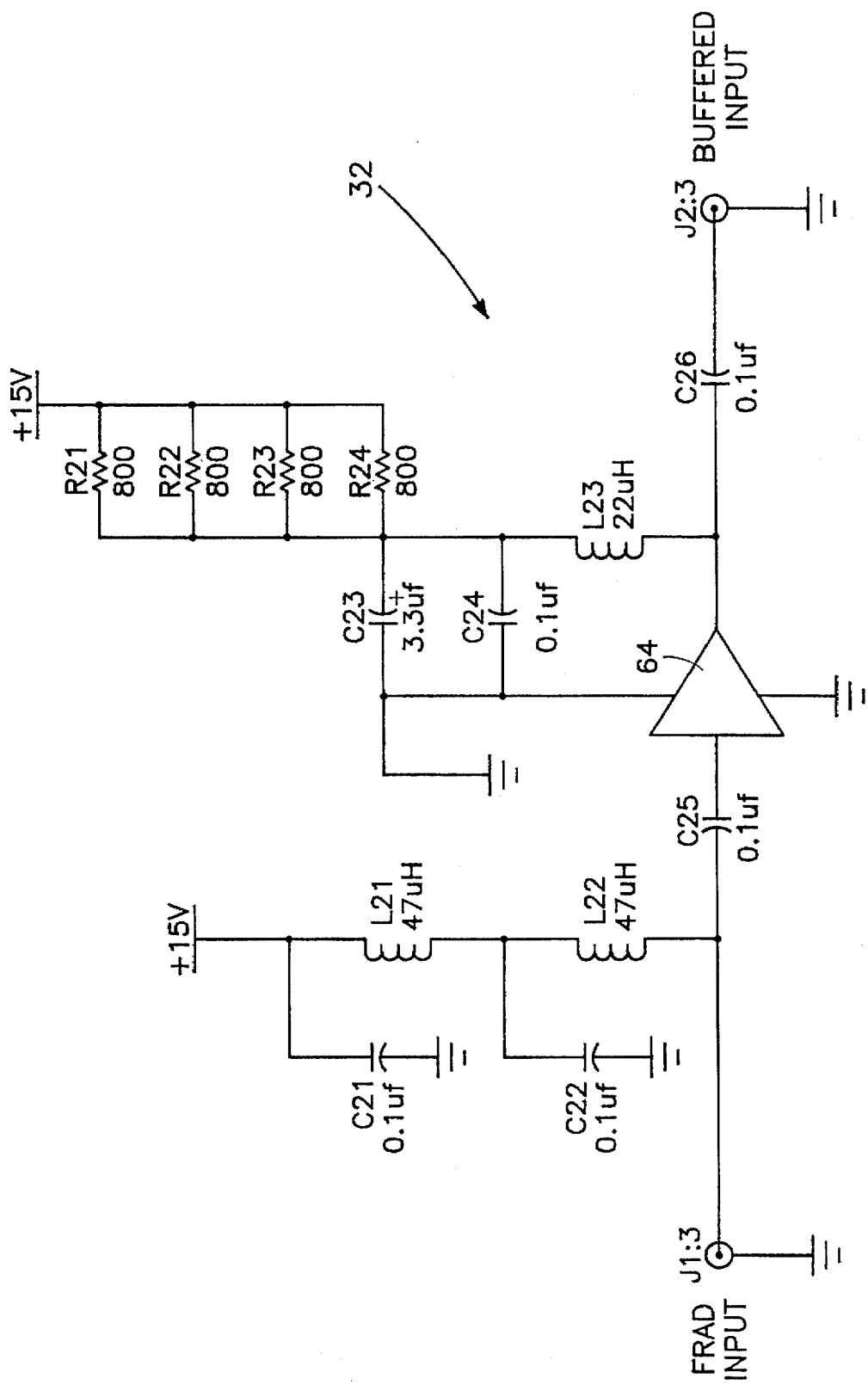
FIG. 6 is a detailed electrical schematic diagram of the second stage of the second intermediate frequency buffer illustrated in FIG. 1.

Referring to FIGS. 1, 5 and 6 buffer 32 includes a first stage (illustrated in FIG. 5) and a second stage (illustrated in FIG. 6) for amplifying the second intermediate frequency signal from the radar receiver, while isolating buffer 32 from the missile's radar receiver. The first stage of buffer 32 is a high impedance amplifier with about 18 dB of gain. Transistor Q2 is a VHF junction field effect transistor (JFET) configured as a common source amplifier to not load the radar receiver's second intermediate frequency while providing significant signal gain. Biasing resistors, R1 and R4 are isolated from the input signal by resistor R2 and capacitor C4 to reduce noise. Capacitor C4 grounds thermal noise generated in resistors R1 and R4, while resistor R2 biases the gate of junction field effect transistor Q2 to the proper level. The input impedance at the frequencies of interest is determined by resistor R2. The output impedance of the first stage of buffer 32 is determined by resistor R3 and is about 2 kilo-ohms.

Transistor Q1 of buffer 32 is a VHF NPN transistor which is configured as a common collector amplifier. Transistor Q1 of buffer 32 operates as a low output impedance buffer and drives several feet of 50 ohm coax cable 63 to the next amplification stage. Q1 is biased for a drain current of about 2 mA and Q1 is biased for a collector current of 14 mA. This amplifier has a noise figure of about 10 dB and a third order intercept point of 30 dBm. The reverse gain through the first stage of buffer 32 is greater than −60 dB at the frequencies of interest. Thus, a high degree of isolation is provided by transistors Q1 and Q2 insuring that any external signals do not enter the radar's intermediate frequency components.

Fifteen volts, which is the power for the first stage of buffer 32, is supplied through a center conductor of the output coax cable 63. Capacitor C5 operates as a direct current block and the network comprising inductors L1 and L2 and capacitors C1, C2 and C3 isolates the output signal from the amplifier power supply rail.

Referring to FIGS. 1, 5 and 6 the output terminal J1 of the first stage of buffer 32 is connected to the input terminal J1:3 of the second stage of buffer 32. The second stage of buffer 32 includes a monolithic microwave integrated circuit amplifier 64 which receives the second intermediate frequency signal from the first stage of buffer 32. Amplifier 64 has a gain of 8 dB, a noise figure of 7 dB and a third order intercept of 25.5 dBm. Inductors L21 and L22 of the second stage of buffer 32 allow excitation current for the first stage of buffer 32 to flow on the center conductor of the coax cable 63 while isolating the second intermediate frequency signal from the power supply rail. Capacitor C25 operates as a DC block while allowing the second intermediate frequency signal to pass to amplifier 64. The input impedance and the output impedance for amplifier 64 are each 50 ohms. The output of amplifier 64, which is stable drives several feet (two or more feet) of 50 ohm coaxial cable.

Figure 7:
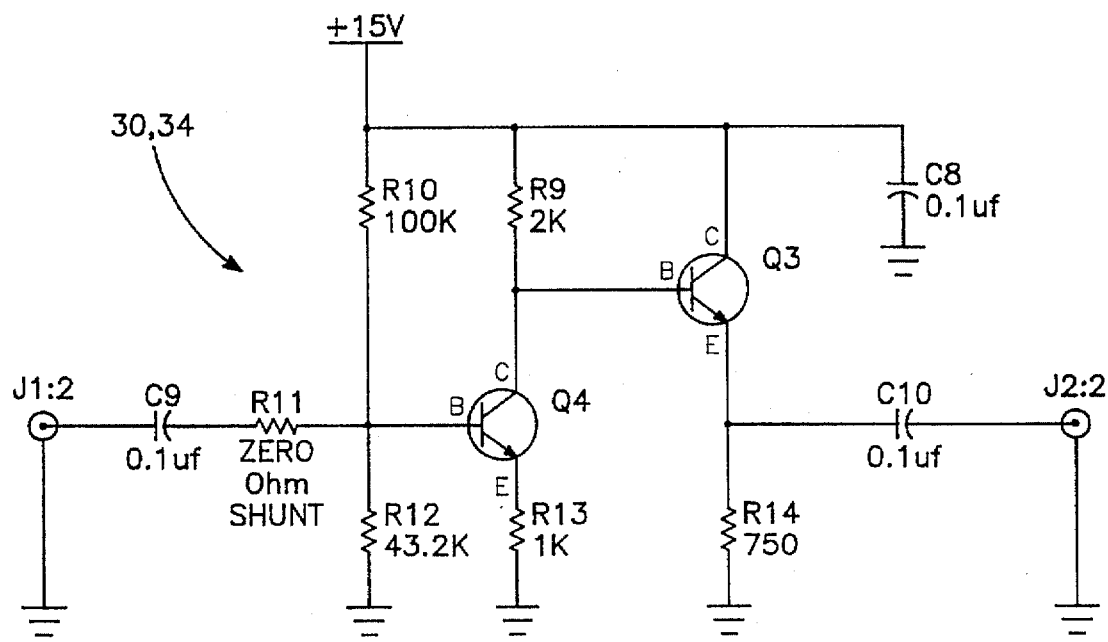
FIG. 7 is a detailed electrical schematic diagram of the voltage controlled oscillator buffer and the second intermediate frequency oscillator buffer of FIG. 1.

Referring to FIGS. 1 and 7, buffers 30 and 34 respectively receive the voltage controlled oscillator and second local oscillator signals from the radar receiver and then buffer the signals using the circuit illustrated in FIG. 7. Buffers 30 and 34 each comprises a two transistor buffer amplifier with the first stage configured as a common emitter and the second stage configured as common collector. The transistor Q4 is biased as a common emitter amplifier with an un-bypassed emitter resistor R13, while the transistor Q3 is biased as a common collector amplifier. The input impedance of each buffer amplifier 30 and 34 is about 19 k-ohms, which is a relatively high input impedance, and is determined from the biasing on transistor Q4. This input resistance of 19 K-ohms does not significantly load the output of the oscillators in the radar receiver which generate the voltage controlled oscillator and second local oscillator signals. The oscillators generating these signals provide about 0 dBm output signal drive into a 50 ohm termination. R11 is a zero ohm shunt resistor which many be increased to allow buffers 30 and 34 to provide additional isolation and attenuation.

The output impedance of each buffer amplifier 30 and 34 is about 50 ohms allowing each buffer amplifier 30 and 34 to drive several feet (two or more feet) of 50 ohm coaxial cable to a 50 ohm load. The output impedance of each buffer amplifier is determined by calculating the output resistance of transistor Q3.

The gain for transistor Q4 is approximately −1.9 (which is relatively small), however, common emitter configured transistor Q4 buffers and isolates the input signal received by buffer 30 or 34 from the output signal provided by buffer 30 or 34.

Thus, buffer amplifiers 30 and 34 provide buffering with their high input impedance, isolation of the radar receiver from the doppler processing circuits with a very low gain and power gain sufficient to drive several feet of cable.

Figure 8:
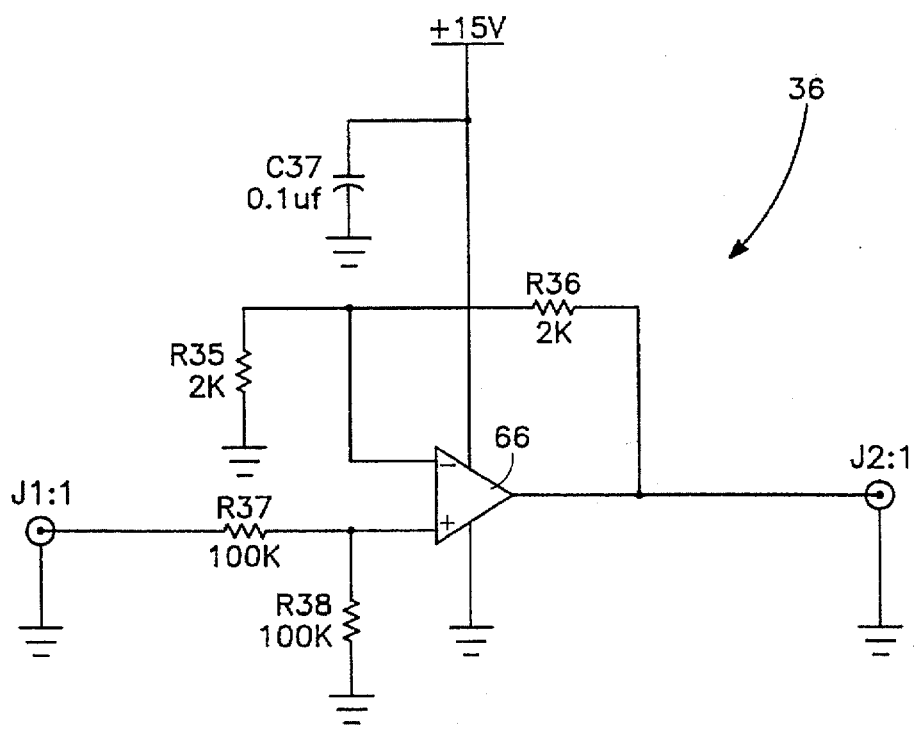
FIG. 8 is a detailed electrical schematic diagram of the front receiver amplitude detector buffer of FIG. 1.
Figure 9:
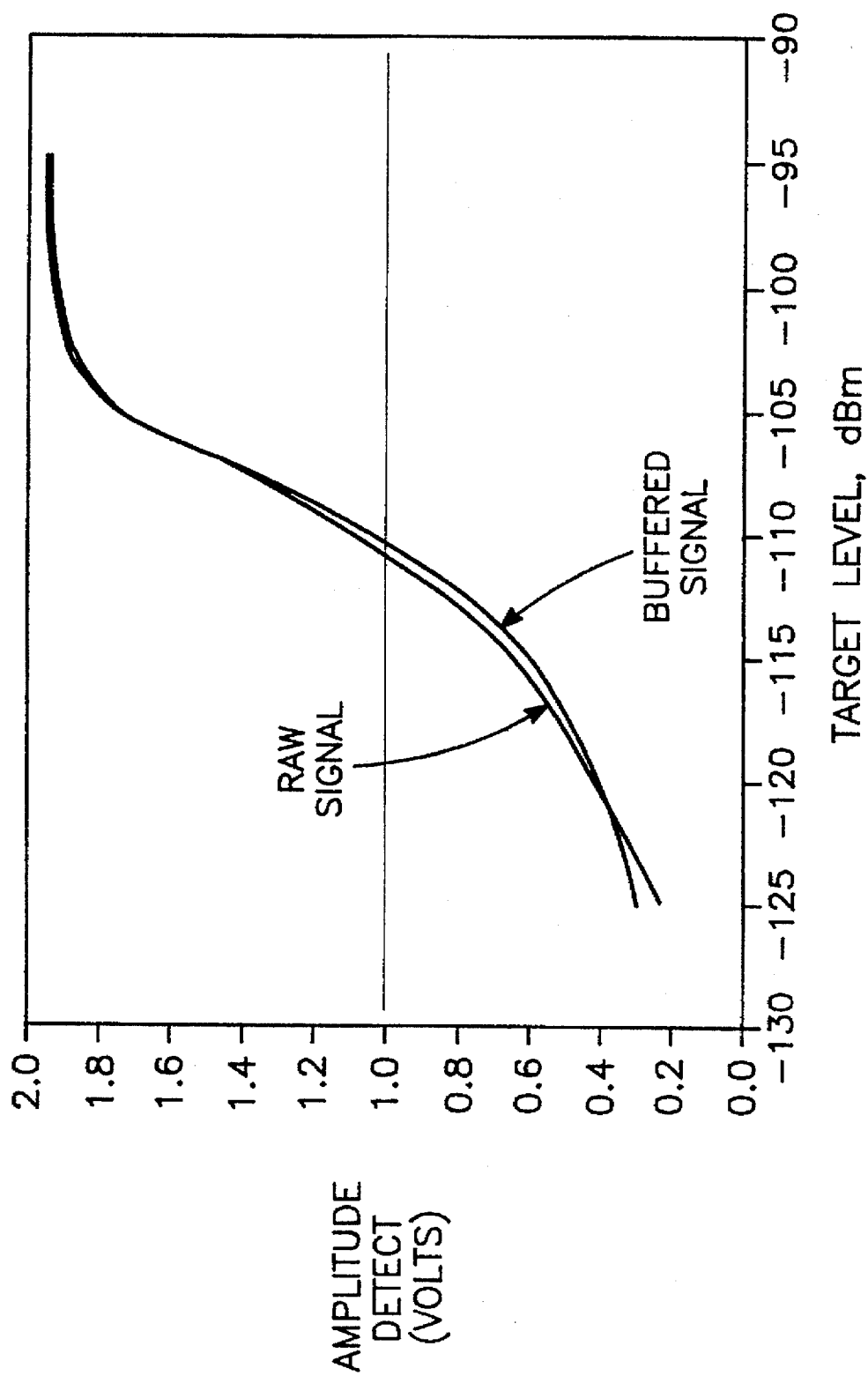
FIG. 9 is a waveform diagram illustrating the output of the front receiver amplitude detector of FIG. 8.

Referring to FIGS. 1 and 8, the radar receiver provides a front receiver amplitude detector out signal which indicates receiver signal strength. This signal is supplied to a buffer amplifier 36 comprising a non-inverting operational amplifier 66 and a voltage divider circuit consisting of resistors R37 and R38 which is coupled to the non-inverting input of amplifier 66. The attenuation factor of the voltage divider circuit formed by resistors R37 and R38 is 0.5, while the gain provided by amplifier 66 is two resulting in an over all gain of unity for buffer amplifier 36. FIG. 8 illustrates the output of the front receiver amplitude detector both buffered and non-buffered verses target input level. The two signal plots are nearly the same indicating that this signal is not being loaded by buffer amplifier 36.

Figure 10:
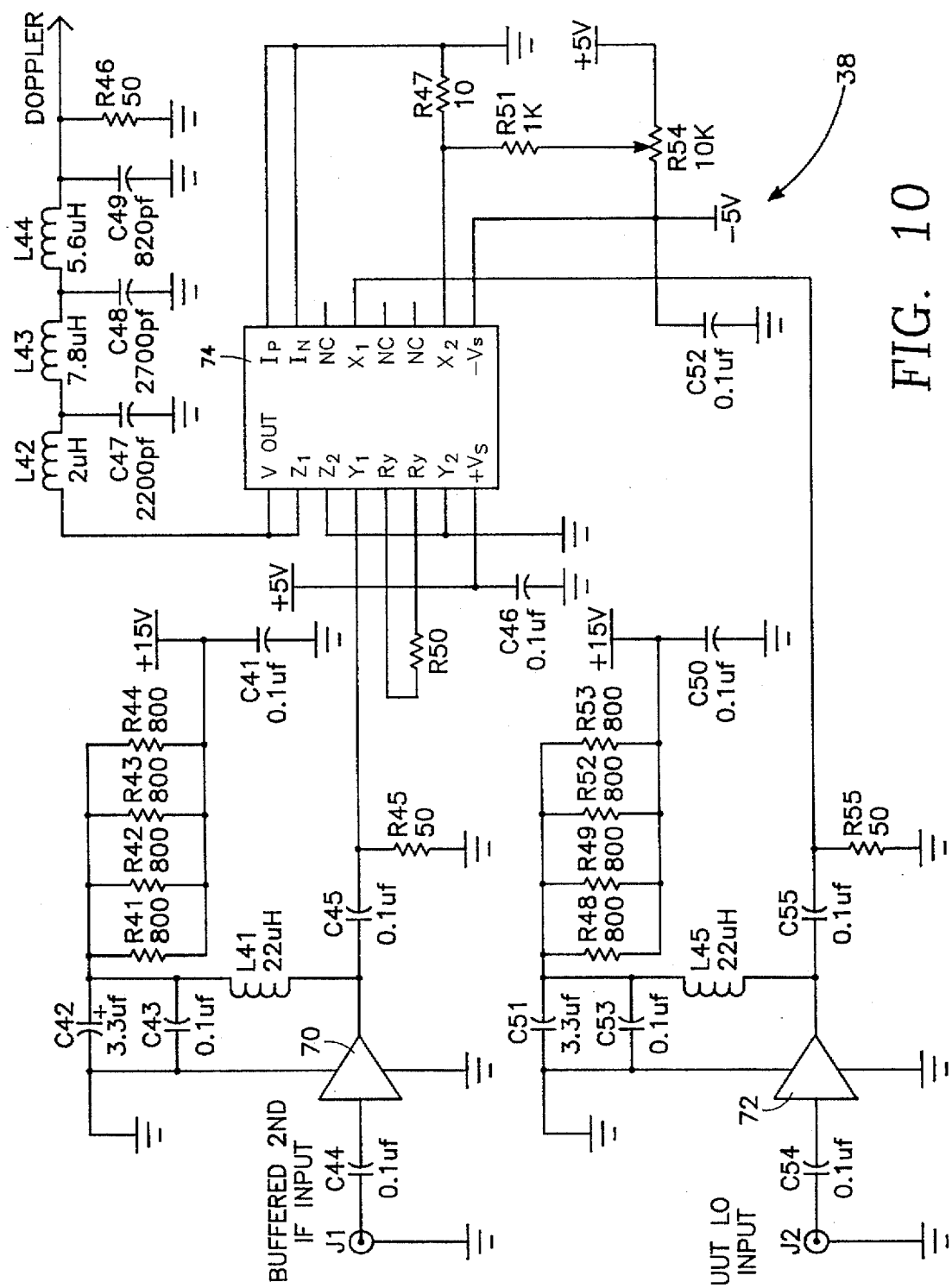
FIG. 10 is a detailed electrical schematic diagram of the doppler processing circuit including the mixer and bandpass filter of FIG. 2.

Referring to FIGS. 1, 2 and 10, a detailed electrical schematic diagram of the circuit of FIG. 2 is shown in FIG. 10. The buffered second intermediate frequency signal is supplied to a terminal J1 of circuit 38, while the buffered second local oscillator signal is supplied to a terminal J2 of circuit 38. The second intermediate frequency signal is supplied to a monolithic microwave integrated circuit amplifier 70 which buffers this signal. In a like manner, the second local oscillator signal is supplied to a monolithic microwave integrated circuit amplifier 72 which buffers this signal. The second intermediate frequency and the second local oscillator signals are next supplied to a double balanced mixer 74 which mixes the signals down converting the second intermediate frequency signal to base band. Resistor R50 is used to set the gain for double balanced mixer 74. Mixer 74 is depicted generally as mixer 46 in FIG. 2.

A bandpass filter comprising inductors L42, L43 and L44 and capacitors C47, C48 and C49 filters/removes unwanted mixer products from the signal provided by double balanced mixer 74. The signal occurring at the output of the bandpass filter (filter 50 in FIG. 2) is the reconstructed doppler video signal.

Circuit 38 includes a variable resistor R54 and a fixed resistor R51 which may be used to balance double balanced mixer 74 and thereby suppress local oscillator feed through. However, the bandpass filter of circuit 38 effectively suppresses local oscillator feed through.

At this time it should be noted that the double balanced mixer used in the preferred embodiment of the present invention is a Model MPY600 Wide Bandwidth Signal Multiplier commercially available from Burr-Brown Corporation of Tucson, Ariz. Amplifiers 70 and 72 as well as amplifier 64 (FIG. 6) are Model MSA-0486 Monolithic Microwave Integrated Circuit Amplifiers commercially available from Hewlett Packard of Palo Alto, Calif.

Figure 11:
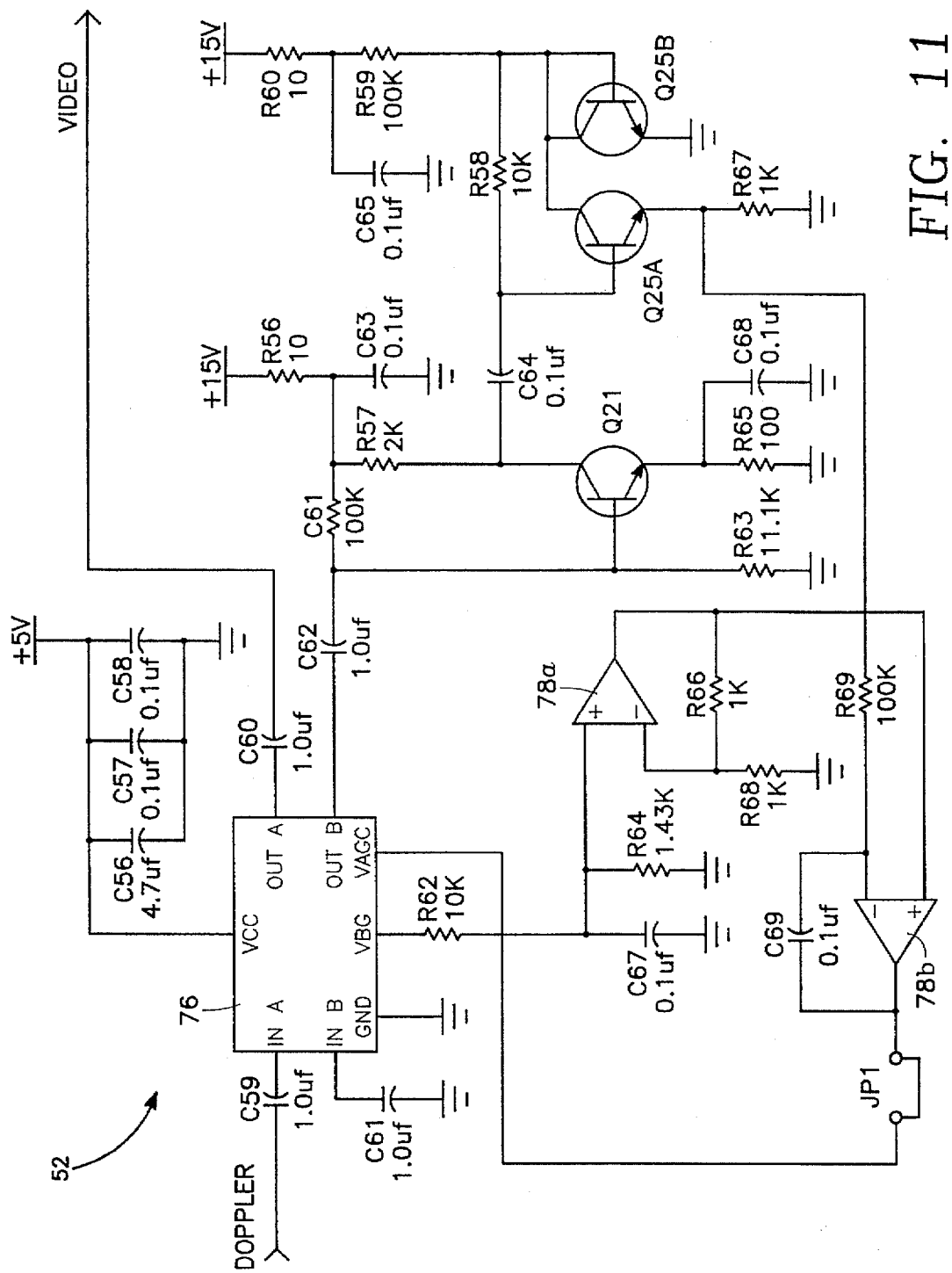
FIG. 11 is a detailed electrical schematic diagram of the automatic gain control circuit of FIG. 2.

Referring to FIGS. 1, 2 and 11, the reconstructed doppler video signal is supplied to the doppler input of automatic gain control circuit 52 which maintains the amplitude of the signal within a predetermined window. This prevents analog-to-digital converter 56 from being over driven or under driven.

Automatic gain control circuit 52 comprises an automatic gain control amplifier 76 having a built-in band gap voltage reference which is used to provide a reference signal for an automatic gain control loop. The band gap voltage reference of amplifier 76 is buffered by an amplifier 78a. The Automatic Gain Control voltage, which is supplied to the VAGC input of amplifier 76, is generated from a half wave rectifier driving an integrator circuit.

Transistor Q21 is a high frequency RF transistor configured as a common emitter amplifier which amplifies the reconstructed doppler video signal prior to the signal being supplied to a half wave rectifier comprising transistors Q25A and Q25B. Transistor Q25A is biased as a class C amplifier with transistor Q25B providing temperature compensation. The signal across resistor R67 is a half wave rectified version of the output signal provided by amplifier circuit 76.

Amplifier 78b, resistor R69 and Capacitor C69 comprise the integrator circuit. When the peak level of the voltage across resistor R67 is lower than the voltage at the inverting input of amplifier 78b, the output of amplifier 78b slews negative, increasing the gain of the automatic gain control amplifier 76. When the peak level of the voltage across resistor R67 is higher than the voltage at the inverting input of amplifier 78b, the output of amplifier 78b slews positive, decreasing the gain of the automatic gain control amplifier 76. The Automatic Gain Control time constant is about 19 Hz. Automatic gain control circuit 52 also includes a jumper JP1 which can be used to break the automatic gain control loop for testing purposes.

At this time it should be noted that the automatic gain control amplifier 76 used in the preferred embodiment of the present invention is a Model NE/SA 5209 Wideband Variable Gain Amplifier commercially available from Philips Semiconductor of Sunnyvale, Calif. In addition, it should be noted that amplifiers 78a and 78b are Model NE/SA5234 low-voltage quad operational amplifiers also commercially available from Philips Semiconductor.

Figure 12:
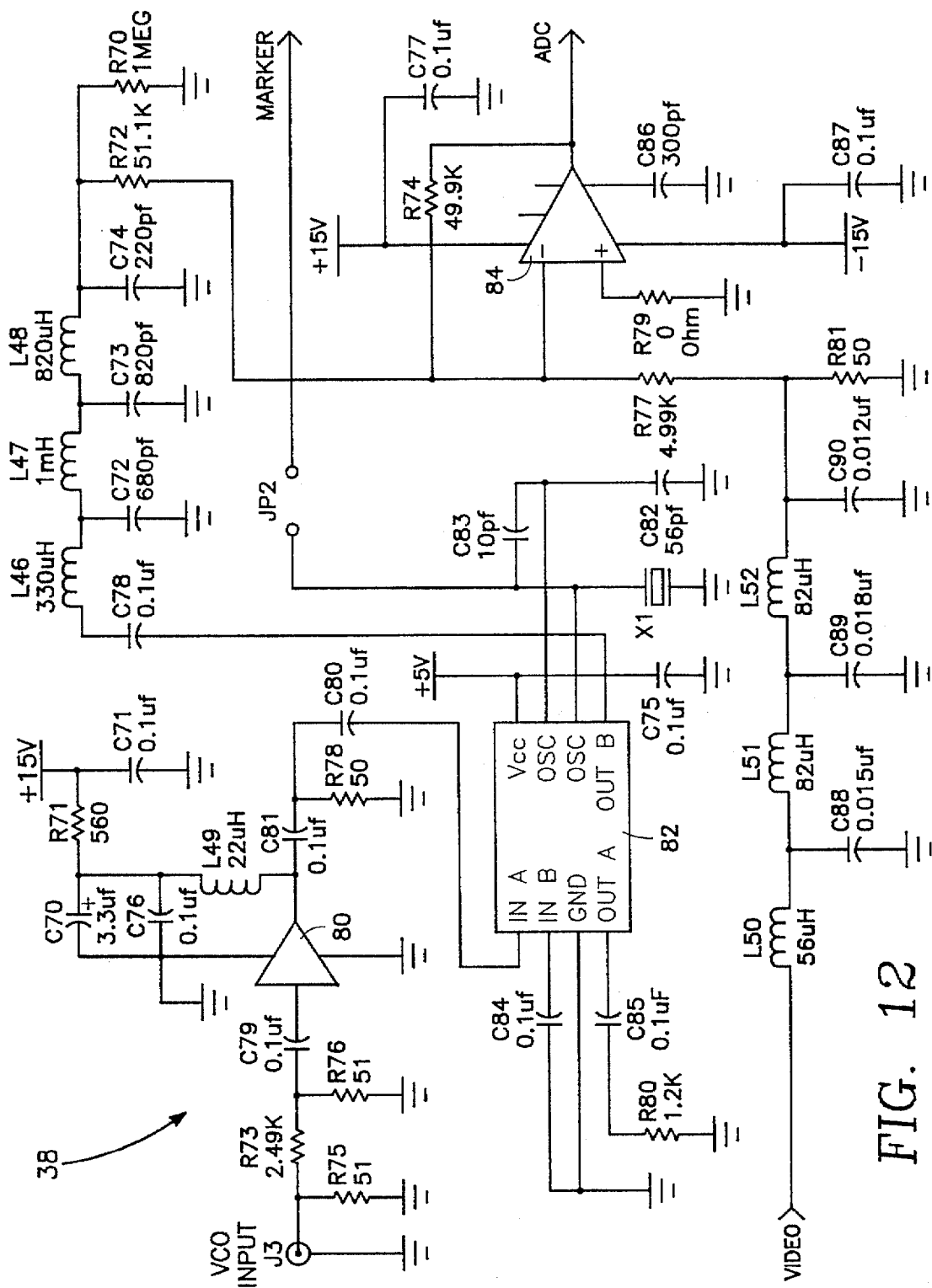
FIG. 12 is a detailed electrical schematic diagram of the marker circuitry, low pass filter and summer of FIG. 2.

Referring to FIGS. 1, 2 and 12, the voltage controlled oscillator signal provided by the missile's radar receiver is used to develop a marker signal which is 20 kHz in doppler above the signal the missile's radar is tracking. The voltage controlled oscillator signal is first buffered by buffer 30. The signal then enters terminal J3 of circuit 38 and passes through resistors R75, R73 and R76 which comprise a 30 dB attenuation pad. The attenuation pad is utilized to prevent amplifier 80 and mixer 82 from being over driven. The level of the voltage controlled oscillator signal at terminal J3 of circuit 38 is about 0 dBm.

The voltage controlled oscillator signal is next supplied to monolithic microwave integrated circuit amplifier 80 that buffers the voltage controlled oscillator signal prior to the signal being supplied to the IN A input of double balanced mixer 82. The marker oscillator signal, which is generated by an oscillator circuit comprising oscillator X1 and capacitors 82 and 83, is also supplied to mixer 82. Mixer 82 then mixes the voltage controlled oscillator signal with the marker oscillator signal. In FIG. 2, mixer 82 of FIG. 12 is depicted as mixer 44 and oscillator X1 of FIG. 12 is depicted as oscillator 42.

A low pass filter comprising inductors L46, L47 and L48 and capacitors C72, C73 and C74 filters unwanted mixer products from the signal provided by double balanced mixer 82. The signal occurring at the output of the low pass filter (filter 48 in FIG. 2) is the marker signal. Circuit 38 also has a summer circuit (summer 54 in FIG. 2) which includes amplifier 84 which is configured as a summing amplifier and resistors R77, R72 and R74. The reconstructed doppler video signal is summed with the marker signal through resistor R77 of circuit 38. Amplifier 84 also buffers the reconstructed doppler video and marker signal.

At this time it should be noted that mixer 82 is a Philips Semiconductor NE602 double balanced mixer oscillator. Amplifier 84 is a Harris Semiconductor Model HA-2520 monolithic operational amplifier.

The frequency of oscillator X1 is selected to generate the frequency of the marker signal at a desired location in doppler which is approximately 20 kHz above the frequency the missile's radar is tracking. Circuit 38 also includes a jumper JP2 which allows an external oscillator to be used in place of oscillator X1 and capacitors C83 and C82.

The network of L50, C88, L51, C89, L52 and C90 comprises an anti-aliasing low pass filter for the reconstructed doppler video signal.

Figure 13:
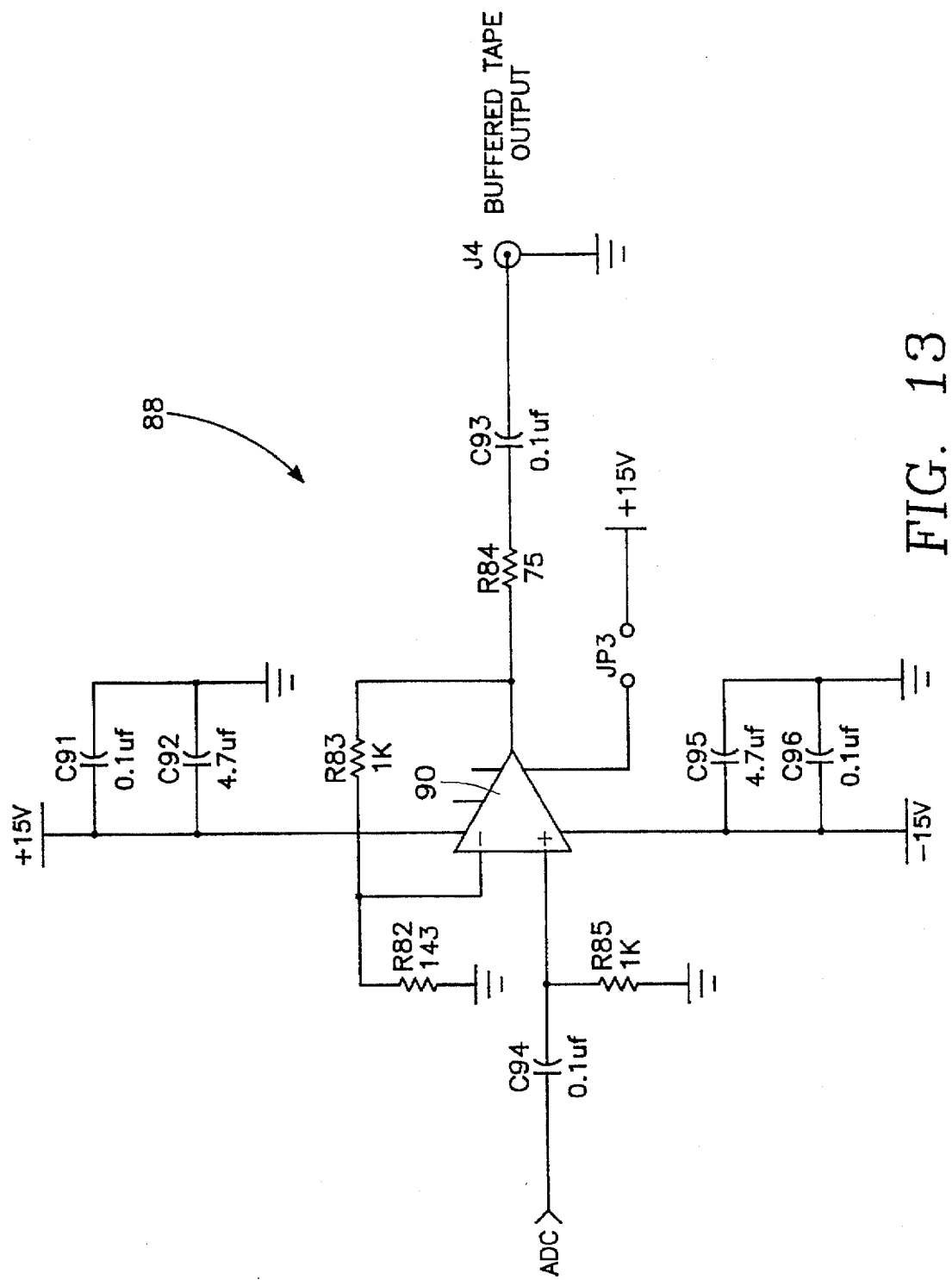
FIG. 13 is a detailed electrical schematic diagram of a video buffer circuit which receives the reconstructed doppler video signal provided by the circuit of FIG. 2.

Referring to FIGS. 1, 2 and 13, there is a video buffer 88 which drives a wide band magnetic tape recorder (not illustrated. Video buffer 88 includes an operational amplifier 90 which may be a Harris Corporation Model HA-5020 operational amplifier or a Harris Corporation Model HA-2842 operational amplifier, each of which is capable of providing drive power to a 75 ohm load. Amplifier 90 is configured as a non-inverting amplifier with an output impedance of 75 ohms. R85 and JP3 are used within buffer 85 depending on whether the Harris Corporation Model HA-5020 operational amplifier or the Harris Corporation Model HA-2842 operational amplifier is used as amplifier 90 in video buffer 88.

Figure 14:
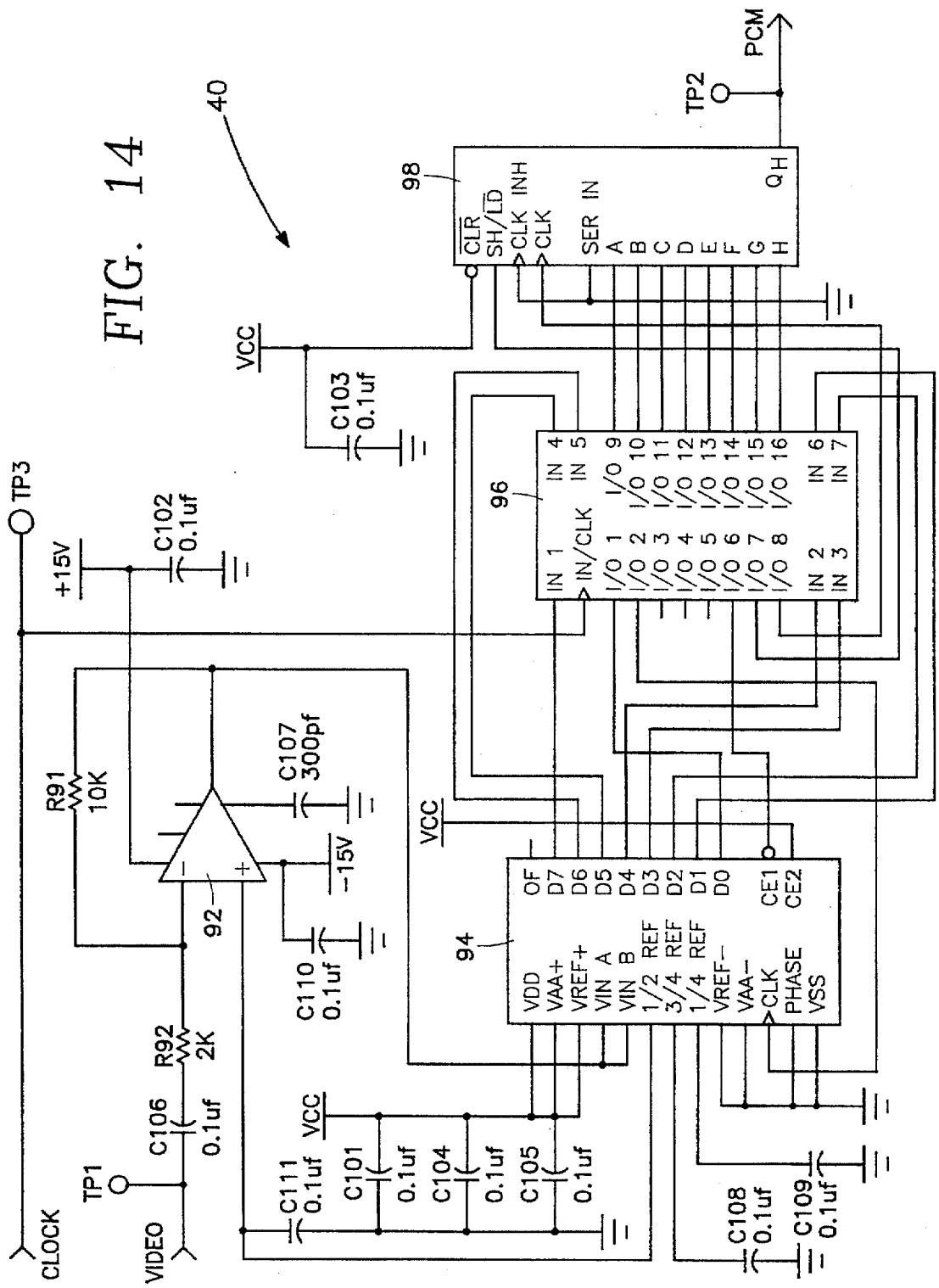
FIG. 14 is a detailed electrical schematic diagram of the analog-to-digital converter and the PCM frame controller of FIG. 1.

Referring now to FIGS. 1, 2 and 14, the reconstructed doppler video signal is supplied to a monolithic operational amplifier 92 within circuit 40, which operates as a driver for the reconstructed doppler video signal when the signal is supplied to analog-to-digital converter 94 (depicted as converter 56 in FIG. 2). The data of the reconstructed doppler video signal is encrypted and is transmitted to a receiving station in a pulse code modulated format. Analog-to-digital converter 94 is an eight bit converter having a sample rate of 625 ksps controlled by an external clock (not illustrated) which generates a 5 MHz clock signal.

Circuit 40 also includes a programmable logic device 96 which operates as a Pulse Code Modulated (PCM) controller and which generates all timing and control signals for analog-to-digital converter 94 and parallel to serial shift register 98.

It should be noted that programmable logic device 96 is depicted as device 60 in FIG. 3 and shift register 98 is depicted as register 62 in FIG. 3. After the converter 94 converts the reconstructed doppler video signal from an analog format to eight bit digital samples or words, PCM controller 96 takes the eight bit data samples and assembles the samples into the PCM data frame of FIG. 4 which includes the two words of the frame synchronization pattern. The eight bit samples of the PCM data stream are then supplied to shift register 98 which converts the samples from an eight bit parallel format to the serial format of FIG. 4. The PCM data frame is output from shift register 98 as a serial NRZ-L PCM data stream (FIG. 4).

It should also be noted that the Altera EPM 5032 is programmed with frame controller firmware to allow the data to be placed in the frame of FIG. 4 along with the frame synchronization pattern. The design file for device 96 was compiled with Maxplus II, a logic design software commercially available from the Altera Corporation for use with their programmable logic devices. The complete listing of the text design file for the firmware is in Appendix A.

Lines 1–13 of the design file of Appendix A include the file header banner, a two line description of the file, the title of the design and the name of the design which is "PCM_ALT". The next section in the design file which begins at line 15 and ends at line 33 is the subdesign section which describes the input and output signals for programmable array logic device 96.

Following the subdesign section is a section describing internal variables used by the programmable array logic device 96 (lines 36–39 of the design file of Appendix A). WRD_CNT[9..0] defines a word counter which is implemented by a group of ten D flip-flops that count the words in a frame of the PCM data stream. The word counter has ten bits and thus can count from 0 to 1023 resulting in the 1024 words of the telemetry frame. SUB_WRD_CNT [2..0] defines a sub-word counter comprising a group of three D type flip-flops which count from 0 to 7, the number of bits in each word of the telemetry data frame.

The main body of the design file of Appendix A starts at line 41 with the key word BEGIN and ends at line 104 with the key word END. Line 43 of the design file, SHFT_CLK= SYS_CLK;, sets the shift clock signal to shift register 98 at the same frequency as the system clock which is 5 MHz. Line 45 of the design file, SUB_WRD_CNT[].CLK= SYS_CLK, sets the three sub-word flip-flops' clock to the system clock.

Lines 47–49 of the design file of Appendix A implement the counters of programmable logic device 96 and make the counters count up. The sub-word counter counts from 0 to 7 dividing the word period up into eight parts. A count of the eight parts is utilized for sub-word timing.

The word counter, WRD_CNT[], counts up as it is clocked by a state machine which is described at lines 51–68. The case statement for the state machine of programmable array logic device 96 implements a series of compares that when satisfied cause certain events to occur. In this section of the design file of Appendix A each word interval is divided into 8 periods. During the first period the SHFT_SHLD signal of FIG. 15E is asserted to load the parallel to serial shift register 98 with data (line 54 of Appendix A). Otherwise the SHFT_SHLD signal of FIG. 15E is left de-asserted. Further, during the first four periods of the word interval the ADC_CLK signal of FIG. 15B is asserted. During the other periods the ADC_CLK signal of FIG. 15B is de-asserted. This generates a clock signal for the analog-to-digital converter 94 which operates at the word rate.

Lines 70–102 of the code of Appendix A present either data words or frame synchronization words to the data lines connecting programmable array logic device 96 to shift register 98. This is accomplished with a case statement driven off of the word count signal. When WRD_CNT[] is 0 the first frame synchronization word is presented to the data lines connecting device 96 to shift register 98 (lines 71–81 of Appendix A). When WRD_CNT[] is 1 the second frame synchronization word is presented to the data lines connecting device 96 to shift register 98 (lines 82–91 of Appendix A). For the remaining word counts, ADC data is presented to the data lines connecting device 96 to shift register 98 (lines 92–101 of Appendix A).

Figure 15:
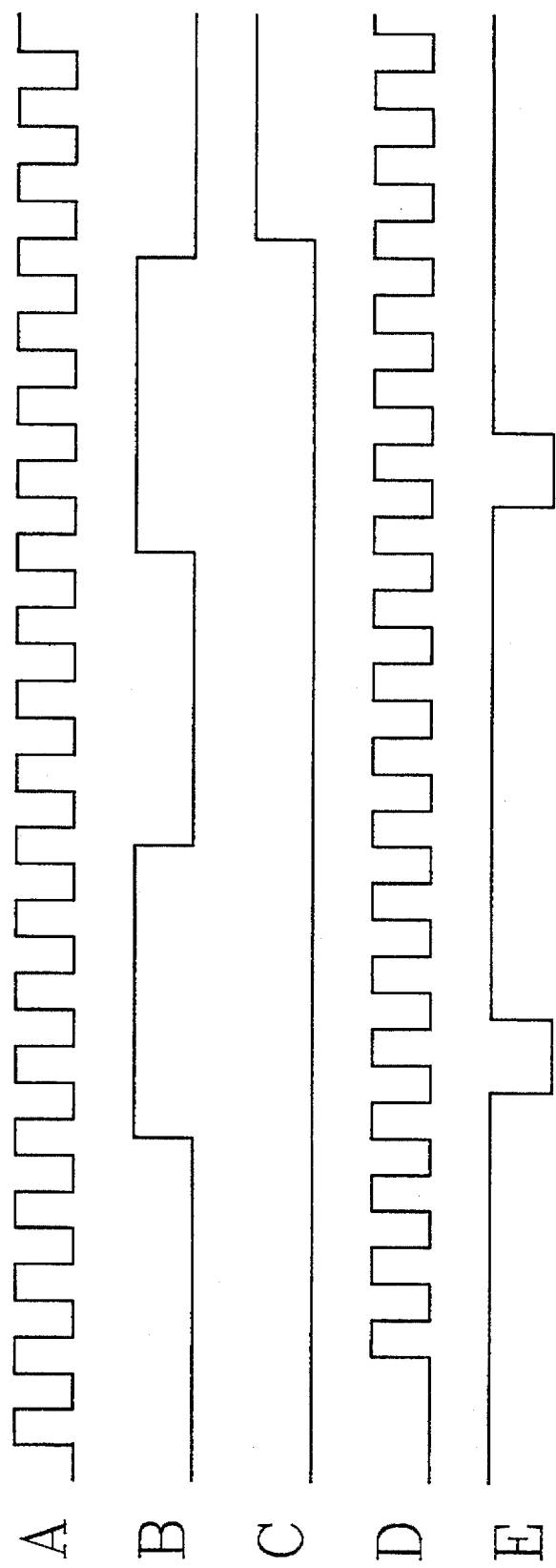
FIG. 15 is a waveform diagram illustrating the timing of control signals generated by the PCM frame controller of FIG. 14.
Figure 16:
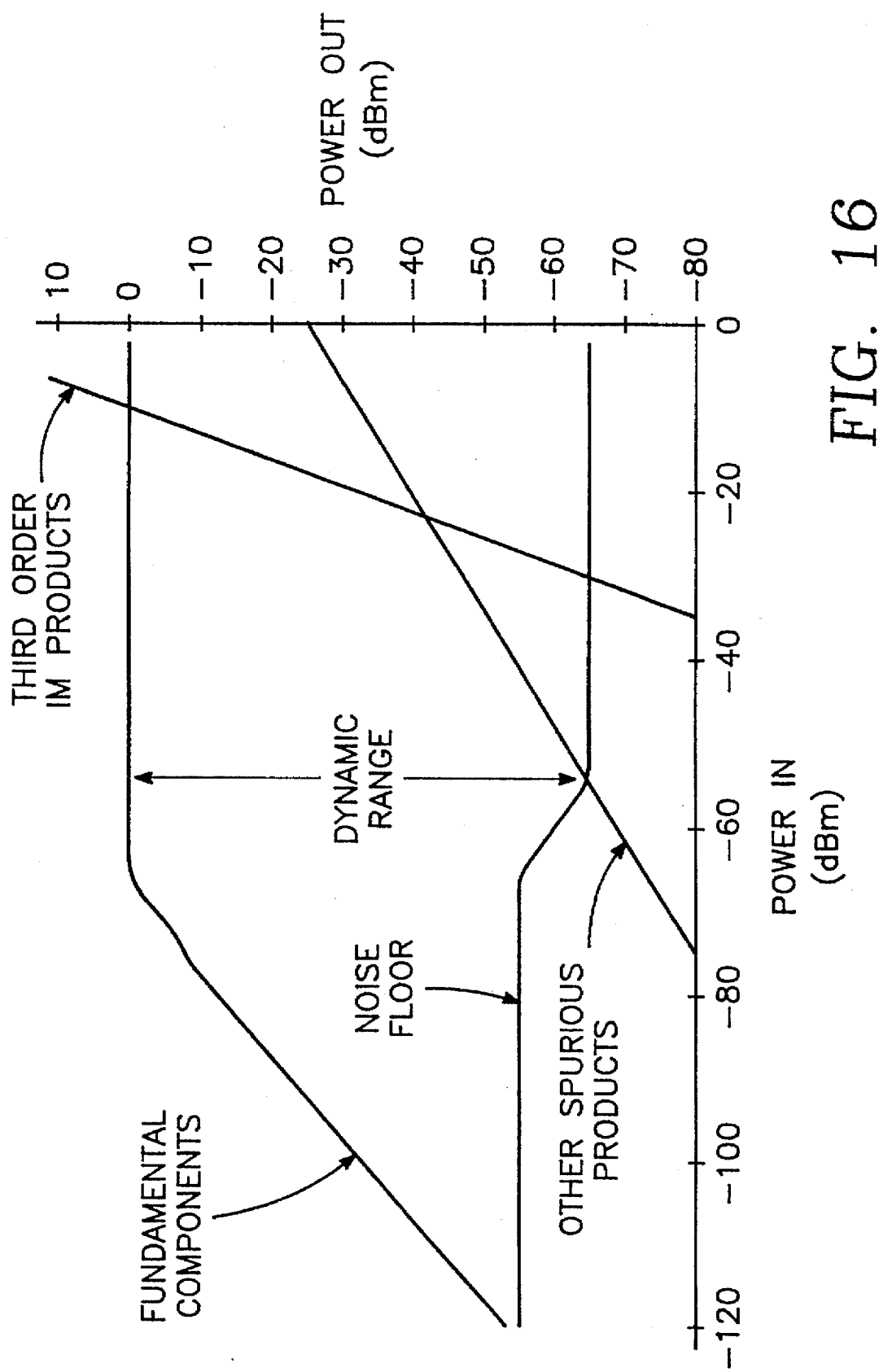
FIG. 16 is a plot illustrating sensitivity, dynamic range and intermodulation performance for the doppler video signal conditioning circuit of FIG. 1.

Referring to FIGS. 14 and 15, the signal of FIG. 15A is the 5 MHz system clock signal which is supplied to the IN/CLK input of programmable array logic device 96. The signal of FIG. 15B is the clock signal for analog-to-converter 94 which is supplied to the CLK input of analog-to-digital converter 94. The signal of FIG. 15C is the chip enable signal for analog-to-digital converter 94 which is supplied to the CE1 input of analog-to-digital converter 94. The signal of FIG. 15D is the clock signal for parallel to serial shift register 98. The signal of FIG. 15E is the shift signal and the load signal for parallel to serial shift register 98.

Figure 17:
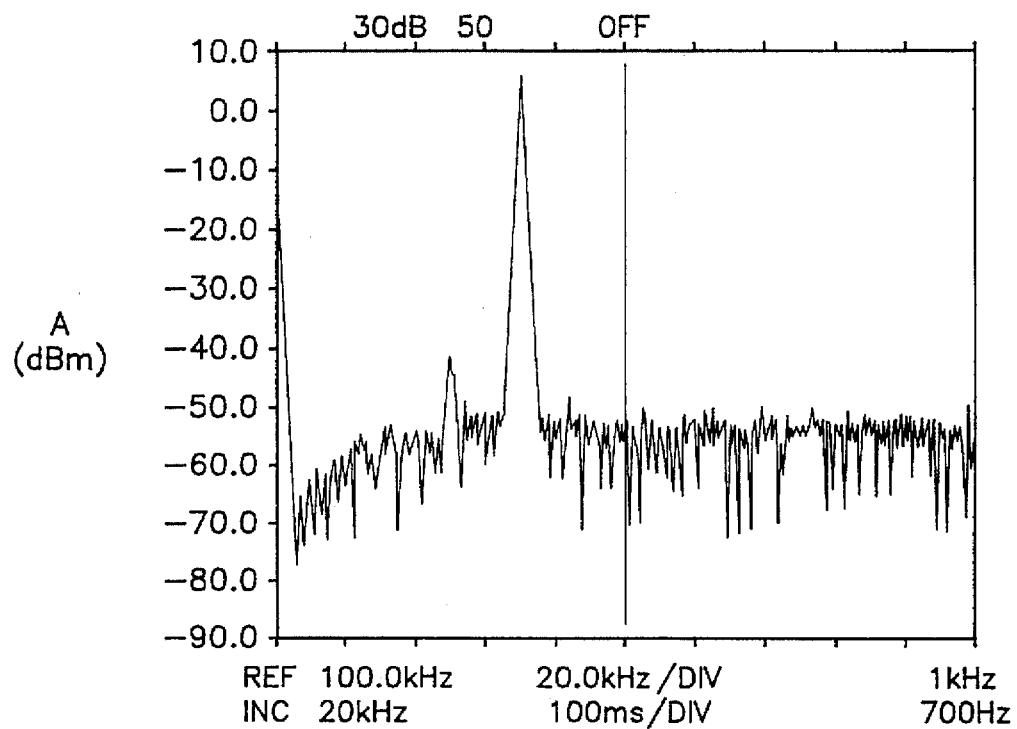
FIG. 17 is a plot from a spectrum analyzer showing the reconstructed doppler video signal monitored at the video input buffer of the present invention.
Figure 18:
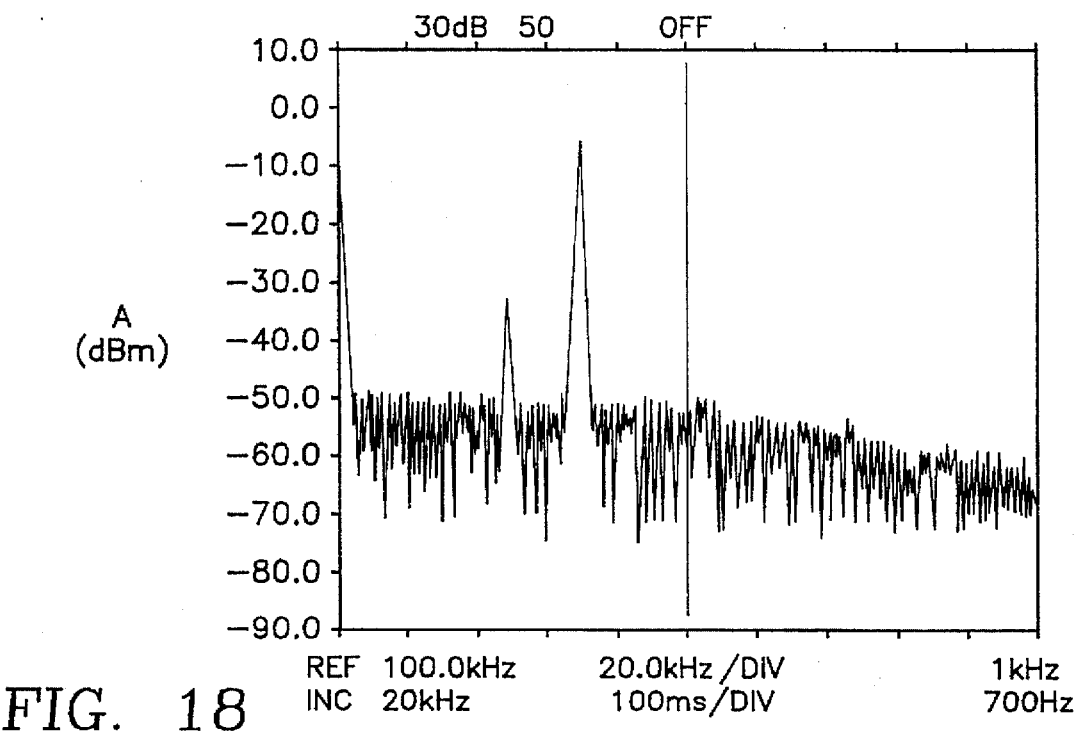
FIG. 18 is a plot from a spectrum analyzer illustrating a target signal at an input level of −80 dBm.
Figure 19:
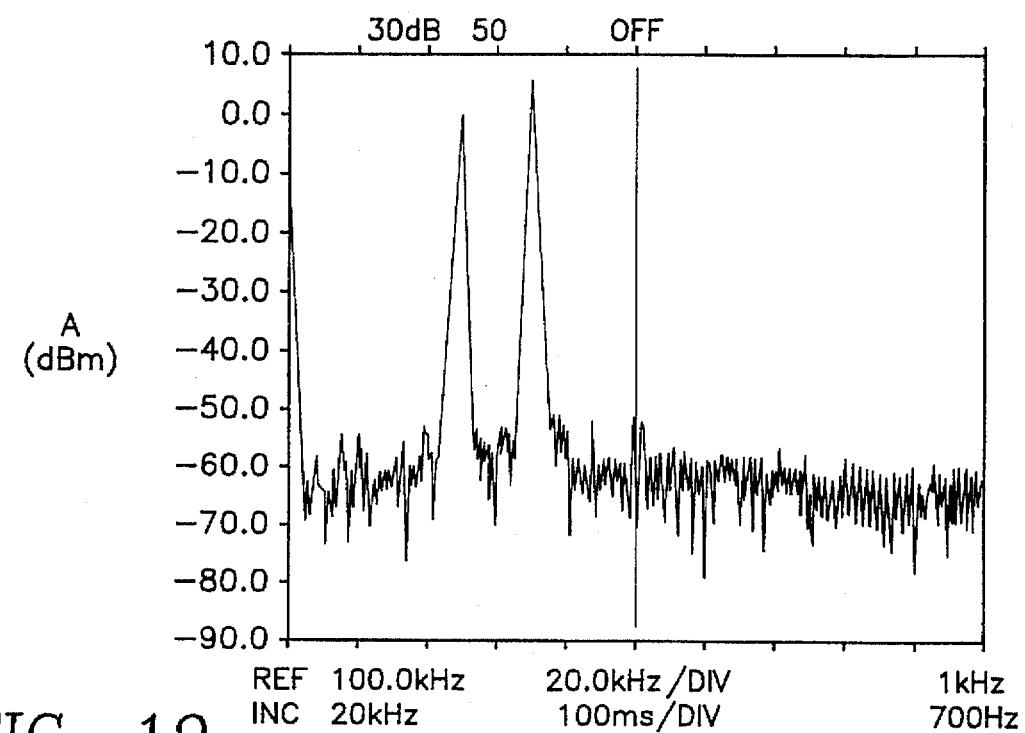
FIG. 19 is a plot from a spectrum analyzer illustrating a target signal at an input level of −60 dBm.
Figure 20:
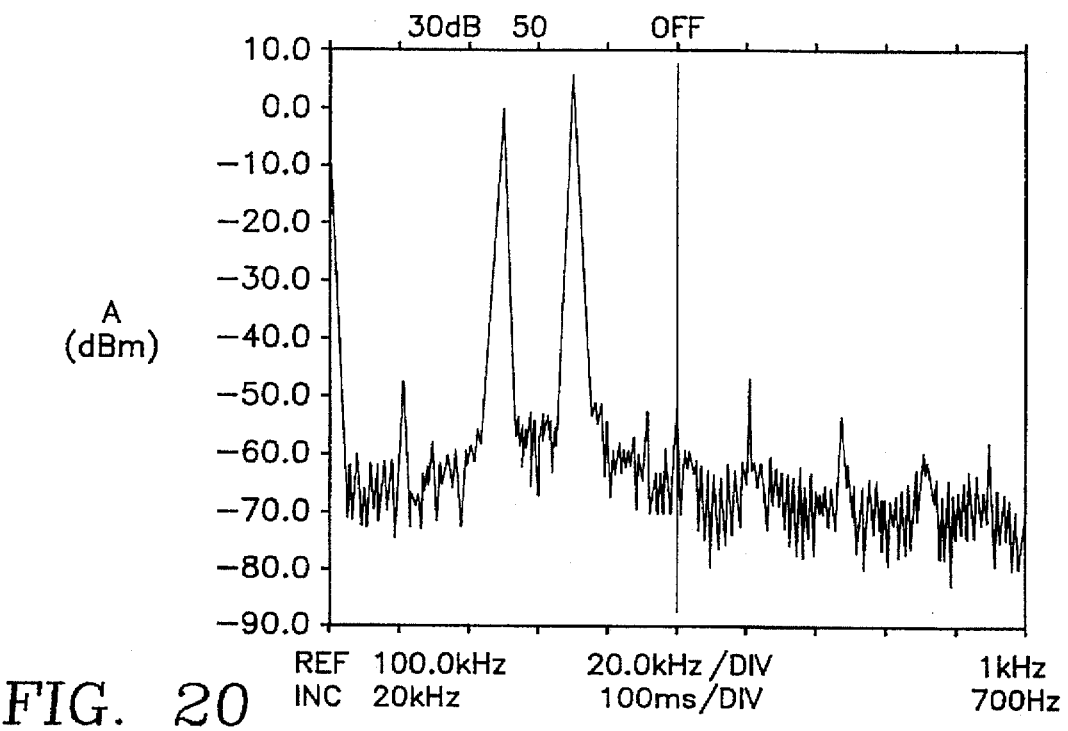
FIG. 20 is a plot from a spectrum analyzer illustrating a target at an input level of −35 dBm.

FIG. 17 is a plot from a spectrum analyzer showing the reconstructed doppler video signal monitored at the video input buffer 88. FIG. 18 is a plot from a spectrum analyzer illustrating a target signal at an input level of −80 dBm. FIG. 19 is a plot from a spectrum analyzer illustrating a target signal at an input level of −60 dBm. FIG. 20 is a plot from a spectrum analyzer illustrating a target at an input level of −35 dBm.

From the foregoing, it may readily be seen that the present invention comprises a new, unique and exceedingly useful doppler video signal conditioning circuit which constitutes a considerable improvement over the known prior art. Obviously many modifications and variations of the present invention are possible in light of the above teachings. It is therefore to be understood that within the scope of the appended claims the invention may be practiced otherwise than as specifically described.

---

Appendix A

PCM VIDEO FRAME CONTROLLER
ANTHONY CIRINEO
11/05/94

```
%
THIS CIRCUITS IMPLEMENTS THE PCM FRAME CONTROLLER
THE DEVICE IS AN ALTERA 5032
%
TITLE "PCM FRAME CONTROLLER WITH EXTERNAL 74HC166";
DESIGN IS "PCM_ALT";
SUBDESIGN PCM_ALT
(
    SYS_CLK         :INPUT;     % SYSTEM CLOCK, 5.0 MHZ %
    ADC_DATA[7...0] :INPUT;     % DATA FROM ADC %
    SHFT_A          :OUTPUT;    % 74166 INPUT %
    SHFT_B          :OUTPUT;    % 74166 INPUT %
    SHFT_C          :OUTPUT;    % 74166 INPUT %
    SHFT_D          :OUTPUT;    % 74166 INPUT %
    SHFT_E          :OUTPUT;    % 74166 INPUT %
    SHFT_F          :OUTPUT;    % 74166 INPUT %
    SHFT_G          :OUTPUT;    % 74166 INPUT %
    SHFT_H          :OUTPUT;    % 74166 INPUT %
    SHFT_SHLD       :OUTPUT;    % 74166 SH_LD INPUT %
    SHFT_CLK        :OUTPUT;    % 74166 CLK INPUT %
    ADC_CLK         :OUTPUT;    % CLK FOR ADC, RUN AT SAMPLE RATE %
    ADC_CE          :OUTPUT;    % CE FOR ADC %
)
VARIABLE
WRD_CNT[9...0]      :DFF;       % COUNTS WORDS IN THE FRAME %
SUB_WRD_CNT[2...0]  :DFF;       % COUNTS SUB WRD INTERVALS %
BEGIN
    SHFT_CLK = SYS_CLK;
    SUB_WRD_CNT[ ] . CLK = SYS_CLK;
    % IMPLEMENT SUB_WORD AND WORD COUNTERS %
    SUB_WRD CNT[ ] = SUB_WRD_CNT [ ] + 1;
    WRD_CNT [ ] = WRD_CNT[_[ ] + 1;
    % IMPLEMENTS SUB WORD TIMING OPERATIONS %
    CASE SUB_WRD_CNT[ ] IS
        WHEN 0 =>
            SHFT_SHLD = GND;        % LOAD THE 74166 WITH DATA %
            ADC_CLK = VCC;
        WHEN 1 =>
            ADC_CLK = VCC;
            SHFT_SHLD = VCC;
        WHEN 2 =>
            ADC_CLK = VCC;
            SHFT_SHLD = VCC;
        WHEN 3 =>
            WRD_CNT[ ] . CLK = VCC; % BUMP WORD COUNTER %
            ADC_CLK = VCC;
            SHFT_SHLD = VCC;
        WHEN OTHERS =>
            SHFT_SHLD = VCC;
    END CASE;
    % IMPLEMENTS LOADING WORDS INTO SHIFT REGISTER %
    CASE WRD_CNT[ ] IS
        WHEN 0 =>              % FRAME SYNC WORD 1 %
            ADC_CE = VCC;
            SHFT_A = VCC;      % 1 %
            SHFT_B = VCC;      % 1 %
            SHFT_C = GND;      % 0 %
            SHFT_D = VCC;      % 1 %
            SHFT_E = GND;      % 0 %
            SHFT_F = VCC;      % 1 %
            SHFT_G = VCC;      % 1 %
            SHFT_H = VCC;      % 1 %
        WHEN 1 =>              % FRAME SYSNC WORD 2 %
            ADC_CE = VCC;
```

-continued

Appendix A

```
        SHFT_A = GND;         % 0 %
        SHFT_B = GND;         % 0 %
        SHFT_C = GND;         % 0 %
        SHFT_D = GND;         % 0 %
        SHFT_E = VCC;         % 1 %
        SHFT_F = GND;         % 0 %
        SHFT_G = GND;         % 0 %
        SHFT_H = VCC;         % 1 %
    WHEN OTHERS =>            % DATA WORDS %
        ADC_CE = GND;
        SHFT_A = ADC_DATA[0];
        SHFT_B = ADC_DATA[1];
        SHFT_C = ADC_DATA[2];
        SHFT_D = ADC_DATA[3];
        SHFT_E = ADC_DATA[4];
        SHFT_F = ADC_DATA[5];
        SHFT_G = ADC_DATA[6];
        SHFT_H = ADC_DATA[7];
    END CASE;
END;
% END %
```

What is claimed is:

1. A doppler video signal conditioning circuit particularly adapted for use with a radar including a radar receiver of a missile, said doppler video signal conditioning circuit comprising:

buffer amplifier means for receiving a voltage controlled oscillator signal, an intermediate frequency signal and a local oscillator signal from said radar receiver, said buffer amplifier means buffering said voltage controlled oscillator signal, said intermediate frequency signal and said local oscillator signal to adapt said voltage controlled oscillator signal, said intermediate frequency signal and said local oscillator signal for processing by said doppler video signal conditioning circuit;

oscillator means for generating a marker oscillator signal;

first mixer means coupled to said oscillator means to receive said marker oscillator signal and said buffer amplifier means to receive said voltage controlled oscillator signal, said first mixer means, responsive to said marker oscillator signal and said voltage controlled oscillator signal, generating a marker signal having a sum frequency and a difference frequency;

first filtering means coupled to said first mixer means to receive said marker signal, said first filtering means filtering the sum frequency of said marker signal from said marker signal;

second mixer means coupled to said buffer amplifier means to receive said intermediate frequency signal and said local oscillator signal, said second mixer means, responsive to said intermediate frequency signal and said local oscillator signal, generating a doppler video signal having a sum frequency and a difference frequency;

second filtering means coupled to said second mixer means to receive said doppler video signal, said second filtering means filtering the sum frequency of said doppler video signal from said doppler video signal;

gain control circuit means coupled to said second filtering means to receive said doppler video circuit, said gain control circuit means maintaining the amplitude of said doppler video signal within a predetermined amplitude window;

summing means coupled to said gain control circuit means to receive said doppler video signal and said first filtering means to receive said marker signal, said summing means combining said marker signal with said doppler video signal to provide a marker within said doppler video signal, the marker of said doppler video signal being a predetermined frequency above a tracking frequency for the radar of said missile;

conversion means coupled to said summing means to receive said doppler video signal, said conversion means converting said doppler video signal from an analog format to a plurality of digital words having digital data therein;

controller means coupled to said conversion means to receive said plurality of digital words of said doppler video signal, said controller means assembling said plurality of digital words into a plurality of telemetry frames, each of said telemetry frames having a predetermined number of said digital words, said controller means inserting a pair of frame synchronization words within each of said telemetry frames; and shift register means coupled to said controller means to receive said plurality of telemetry frames, said shift register means converting said digital words and said frame synchronization words of each of said telemetry frames from a parallel format to a serial format.

2. The doppler video signal conditioning circuit of claim 1 wherein said buffer amplifier means comprises:

a first buffer amplifier coupled to said radar receiver to receive said voltage controlled oscillator signal;

a second buffer amplifier coupled to said radar receiver to receive said intermediate frequency signal; and a third buffer amplifier coupled to said radar receiver to receive said local oscillator signal.

3. The doppler video signal conditioning circuit of claim 1 wherein said first filtering means comprises a low pass filter.

4. The doppler video signal conditioning circuit of claim 1 wherein said second filtering means comprises a bandpass filter.

5. The doppler video signal conditioning circuit of claim 1 wherein said gain control circuit means comprises a wideband variable gain amplifier.

6. The doppler video signal conditioning circuit of claim 1 wherein said conversion means comprises an eight bit analog-to-digital converter.

7. The doppler video signal conditioning circuit of claim 1 wherein said controller means comprises a programmed array logic device.

8. The doppler video signal conditioning circuit of claim 1 wherein said shift register means comprises an eight bit serial to parallel shift register.

9. The doppler video signal conditioning circuit of claim 1 wherein said predetermined frequency the marker of said doppler video signal is above the tracking frequency for the radar of said missile is approximately twenty kilo-hertz.

10. The doppler video signal conditioning circuit of claim 1 wherein said predetermined number of said digital words of each of said telemetry frames comprises 1022 eight bit digital words.

11. The doppler video signal conditioning circuit of claim 1 wherein said pair of frame synchronization words has a frame synchronization bit pattern comprising 1110 1011 and 1001 0000.

12. A doppler video signal conditioning circuit particularly adapted for use with a radar including a radar receiver of a missile, said doppler video signal conditioning circuit comprising:

a buffer circuit coupled to said radar receiver, said buffer circuit including a first buffer amplifier for receiving a voltage controlled oscillator signal from said radar receiver, a second buffer amplifier for receiving an intermediate frequency signal from said radar receiver and a third buffer amplifier for receiving a local oscillator signal from said radar receiver;

said buffer circuit buffering said voltage controlled oscillator signal, said intermediate frequency signal and said local oscillator signal allowing said doppler video signal conditioning circuit to process said voltage controlled oscillator signal, said intermediate frequency signal and said local oscillator signal;

an oscillator circuit for generating a marker oscillator signal;

a first mixer coupled to said oscillator circuit to receive said marker oscillator signal and said buffer circuit to receive said voltage controlled oscillator signal, said first mixer, responsive to said marker oscillator signal and said voltage controlled oscillator signal, generating a marker signal having a sum frequency and a difference frequency;

a low pass filter coupled to said first mixer to receive said marker signal, said low pass filter filtering the sum frequency of said marker signal from said marker signal;

a second mixer coupled to said buffer circuit to receive said intermediate frequency signal and said local oscillator signal, said second mixer, responsive to said intermediate frequency signal and said local oscillator signal, generating a doppler video signal having a sum frequency and a difference frequency;

a bandpass filter coupled to said second mixer to receive said doppler video signal, said bandpass filter filtering the sum frequency of said doppler video signal from said doppler video signal;

a gain control circuit coupled to said bandpass filter to receive said doppler video circuit, said gain control circuit maintaining the amplitude of said doppler video signal within a predetermined amplitude window;

a summing circuit coupled to said gain control circuit to receive said doppler video signal and said low pass filter to receive said marker signal, said summing circuit combining said marker signal with said doppler video signal to provide a marker within said doppler video signal, the marker of said doppler video signal being a predetermined frequency above a tracking frequency for the radar of said missile;

an analog-to-digital converter coupled to said summing circuit to receive said doppler video signal, said analog-to-digital converter converting said doppler video signal from an analog format to a plurality of digital words having digital data therein;

a programmed array logic device coupled to said analog-to-digital converter to receive said plurality of digital words of said doppler video signal, said programmed array logic device assembling said plurality of digital words into a plurality of telemetry frames, each of said telemetry frames having a predetermined number of said digital words, said programmed array logic device inserting a pair of frame synchronization words within each of said telemetry frames; and a parallel to serial shift register coupled to said programmed array logic device to receive said plurality of telemetry frames, said parallel to serial shift register converting said digital words and said frame synchronization words of each of said telemetry frames from a parallel format to a serial format.

13. The doppler video signal conditioning circuit of claim 12 wherein said predetermined frequency the marker of said doppler video signal is above the tracking frequency for the radar of said missile is approximately twenty kilo-hertz.

14. The doppler video signal conditioning circuit of claim 12 wherein said predetermined number of said digital words of each of said telemetry frames comprises 1022 eight bit digital words.

15. The doppler video signal conditioning circuit of claim 12 wherein said pair of frame synchronization words has a frame synchronization bit pattern comprising 1110 1011 and 1001 0000.

16. A doppler video signal conditioning circuit particularly adapted for use with a radar including a radar receiver of a missile, said doppler video signal conditioning circuit comprising:

a buffer circuit coupled to said radar receiver, said buffer circuit including a first buffer amplifier for receiving a voltage controlled oscillator signal from said radar receiver, a second buffer amplifier for receiving an intermediate frequency signal from said radar receiver and a third buffer amplifier for receiving a local oscillator signal from said radar receiver;

said buffer circuit buffering said voltage controlled oscillator signal, said intermediate frequency signal and said local oscillator signal allowing said doppler video signal conditioning circuit to process said voltage controlled oscillator signal, said intermediate frequency signal and said local oscillator signal;

an oscillator circuit for generating a marker oscillator signal;

a first mixer coupled to said oscillator circuit to receive said marker oscillator signal and said buffer circuit to receive said voltage controlled oscillator signal, said first mixer, responsive to said marker oscillator signal and said voltage controlled oscillator signal, generating a marker signal having a sum frequency and a difference frequency;

a low pass filter coupled to said first mixer to receive said marker signal, said low pass filter filtering the sum frequency of said marker signal from said marker signal;

a second mixer coupled to said buffer circuit to receive said intermediate frequency signal and said local oscillator signal, said second mixer, responsive to said intermediate frequency signal and said local oscillator signal, generating a doppler video signal having a sum frequency and a difference frequency;

a bandpass filter coupled to said second mixer to receive said doppler video signal, said bandpass filter filtering the sum frequency of said doppler video signal from said doppler video signal;

a gain control circuit coupled to said bandpass filter to receive said doppler video circuit, said gain control circuit maintaining the amplitude of said doppler video signal within a predetermined amplitude window;

a summing circuit coupled to said gain control circuit to receive said doppler video signal and said low pass filter to receive said marker signal, said summing circuit combining said marker signal with said doppler video signal to provide a marker within said doppler video signal, the marker of said doppler video signal being a predetermined frequency above a tracking frequency for the radar of said missile;

a video buffer connected to said summing circuit to receive said doppler video signal, said video buffer amplifying said doppler video signal to provide an amplified doppler video signal having a predetermined output voltage level;

an analog-to-digital converter coupled to said summing circuit to receive said doppler video signal, said analog-to-digital converter converting said doppler video signal from an analog format to a plurality of digital words having digital data therein;

a programmed array logic device coupled to said analog-to-digital converter to receive said plurality of digital words of said doppler video signal, said programmed array logic device assembling said plurality of digital words into a plurality of telemetry frames, each of said telemetry frames having a predetermined number of said digital words, said programmed array logic device inserting a pair of frame synchronization words within each of said telemetry frames; and a parallel to serial shift register coupled to said programmed array logic device to receive said plurality of telemetry frames, said parallel to serial shift register converting said digital words and said frame synchronization words of each of said telemetry frames from a parallel format to a serial format;

said programmed array logic device receiving an externally generated clock signal, said programmed array logic device, responsive to said externally generated clock signal generating timing and control signals;

said analog-to-digital converter receiving some of said timing and control signals, said analog-to digital converter, responsive to said timing and control signals received thereby, converting said doppler video signal from said analog format to said plurality of digital words;

said parallel to serial shift register receiving a remainder of said timing and control signals, responsive to said timing and control signals received thereby, converting said digital words and said frame synchronization words of each of said telemetry frames from said parallel format to said serial format.

17. The doppler video signal conditioning circuit of claim 16 wherein said predetermined frequency the marker of said doppler video signal is above the tracking frequency for the radar of said missile is approximately twenty kilo-hertz.

18. The doppler video signal conditioning circuit of claim 16 wherein said predetermined number of said digital words of each of said telemetry frames comprises 1022 eight bit digital words.

19. The doppler video signal conditioning circuit of claim 16 wherein said pair of frame synchronization words has a frame synchronization bit pattern comprising 1110 1011 and 1001 0000.

20. The doppler video signal conditioning circuit of claim 16 wherein predetermined output voltage level of said amplified doppler video signal is approximately one volt peak to peak.

* * * * *